United States Patent
Wahlström

(10) Patent No.: US 11,512,621 B2
(45) Date of Patent: Nov. 29, 2022

(54) EXHAUST AFTERTREATMENT ARRANGEMENT FOR AN EXHAUST SYSTEM OF AN INTERNAL COMBUSTION ENGINE

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/276,658

(22) PCT Filed: Oct. 9, 2018

(86) PCT No.: PCT/EP2018/077510
§ 371 (c)(1),
(2) Date: Mar. 16, 2021

(87) PCT Pub. No.: WO2020/074072
PCT Pub. Date: Apr. 16, 2020

(65) Prior Publication Data
US 2022/0042433 A1  Feb. 10, 2022

(51) Int. Cl.
*F01N 3/28* (2006.01)
*F01N 3/10* (2006.01)
(Continued)

(52) U.S. Cl.
CPC .......... *F01N 3/2853* (2013.01); *F01N 3/0211* (2013.01); *F01N 3/103* (2013.01);
(Continued)

(58) Field of Classification Search
CPC combination set(s) only.
See application file for complete search history.

(56) References Cited

U.S. PATENT DOCUMENTS 4,043,761 A * 8/1977 Gaysert ................. F01N 3/2853
422/179
4,456,457 A 6/1984 Nozawa et al.
(Continued)

FOREIGN PATENT DOCUMENTS

EP  1515011 A1  3/2005
JP  S57165617 A  10/1982

OTHER PUBLICATIONS

International Search Report and Written Opinion dated Dec. 3, 2018 in corresponding International PCT Application No. PCT/EP2018/077510, 9 pages.
(Continued)

*Primary Examiner* — Binh Q Tran
(74) *Attorney, Agent, or Firm* — Venable LLP; Jeffri A. Kaminski

(57) ABSTRACT

The invention relates to an exhaust aftertreatment arrangement (100) for an exhaust system of an internal combustion engine, said exhaust aftertreatment arrangement (100) comprising a fluid passage (30) for exhaust gases from said exhaust system, said fluid passage (30) defining an inner perimeter (32) and an exhaust aftertreatment unit (40) comprising an exhaust aftertreatment element (42) confined by an outer wall (44) defining an outer periphery (46) of the exhaust aftertreatment unit (40), the exhaust aftertreatment unit (40) being sealingly arranged in said fluid passage (30) for enabling flow of said exhaust gases through said exhaust aftertreatment element (42). A leakage treatment member (50) comprising an exhaust aftertreatment component is arranged between said inner perimeter (32) of the fluid passage (30) and said outer periphery (46) of said outer wall (44) of the exhaust aftertreatment unit (40), for aftertreatment of any leakage of said flow of exhaust gases past said aftertreatment unit (40) in said fluid passage (30).

18 Claims, 5 Drawing Sheets

(51) Int. Cl.
*F01N 3/20* (2006.01)
*F01N 3/021* (2006.01)
*B01D 53/94* (2006.01)

(52) U.S. Cl.
CPC ............. *F01N 3/2066* (2013.01); *F01N 3/28* (2013.01); *B01D 53/944* (2013.01); *B01D 53/9418* (2013.01); *B01D 53/9436* (2013.01); *F01N 2250/02* (2013.01); *F01N 2350/06* (2013.01); *F01N 2510/00* (2013.01)

(56) References Cited

U.S. PATENT DOCUMENTS

| | | |
|---|---|---|
| 4,899,540 A | 2/1990 | Wagner et al. |
| 8,596,044 B2* | 12/2013 | Werni ................. F01N 13/0097 60/286 |
| 9,441,513 B2* | 9/2016 | Mitsuda ................ F01N 13/008 |
| 2005/0056008 A1 | 3/2005 | Endo |
| 2006/0177359 A1 | 8/2006 | Sinha et al. |
| 2007/0144126 A1* | 6/2007 | Ohya .................... F01N 3/0222 55/502 |
| 2008/0241007 A1* | 10/2008 | Hardesty ............... F01N 3/0211 422/179 |
| 2014/0178260 A1* | 6/2014 | Duda ....................... F01N 3/28 422/168 |
| 2015/0017072 A1* | 1/2015 | Nishi ................ C04B 35/62892 422/168 |
| 2016/0348552 A1* | 12/2016 | Hatakeyama ......... F01N 3/0222 |
| 2016/0348566 A1* | 12/2016 | Vyelyayev ............ F01N 3/2878 |

OTHER PUBLICATIONS

European Office Action dated Jun. 1, 2022 in corresponding European Application No. 19779932.3, 4 pages.

* cited by examiner

EXHAUST AFTERTREATMENT ARRANGEMENT FOR AN EXHAUST SYSTEM OF AN INTERNAL COMBUSTION ENGINE

CROSS-REFERENCE TO RELATED APPLICATIONS

This application is a U.S. National Stage application of PCT/EP2018/077510, filed Oct. 9, 2018, and published on Apr. 16, 2020, as WO 2020/074072 A1, all of which is hereby incorporated by reference in its entirety.

TECHNICAL FIELD

The invention relates to an exhaust aftertreatment arrangement for an exhaust system of an internal combustion engine, the exhaust aftertreatment arrangement comprising a fluid passage for exhaust gases from said exhaust system, and an exhaust aftertreatment unit comprising an exhaust aftertreatment element, wherein the exhaust aftertreatment unit is sealingly arranged in the fluid passage for enabling flow of said exhaust gases through said exhaust aftertreatment element. Said internal combustion engine can for example be a diesel engine.

The invention can be applied in heavy-duty vehicles, such as trucks, buses and construction equipment. Although the invention will be described with respect to a truck, the invention is not restricted to this particular vehicle, but may also be used in other vehicles such as buses or construction equipment, or passenger cars.

BACKGROUND

Exhaust aftertreatment systems, e.g., on trucks and busses are arranged to reduce emissions of soot particles and nitrogen oxide (NOx) from the exhaust gases from internal combustion engines.

Numerous designs of exhaust aftertreatment systems are available. Exhaust aftertreatment systems may comprise, for example, a Diesel Oxidation Catalyst (DOC) unit for oxidising gas emissions like hydrocarbon (HC) and/or carbon monoxide (CO) and/or Nitric Oxide (NO), a diesel particulate filter (DPF) unit to remove particles from the exhaust, and/or a Selective Catalyst Reduction (SCR) unit to remove NOx, e.g. by reducing NOx to nitrogen ($N_2$)+Oxygen ($O_2$) from the exhaust gases. When an SCR unit is present, the exhaust aftertreatment system may further comprise an arrangement for addition of urea and/or ammonia to the exhaust, and/or an ammonia slip catalyst (ASC).

One known design of an exhaust aftertreatment system involves a diesel particulate filter (DPF) being arranged in a steel sleeve, which in turn is arranged in a fluid passage for exhaust gases coming from the internal combustion engine. The DPF and sleeve arrangement allows for the removal and replacement of the unit. The steel sleeve carrying the diesel particular filter (DPF) is sealingly arranged in the fluid passage to ensure that the exhaust gas flow from the engine passes through the DPF and does not pass around the outside of the sleeve.

For example, US 2005 0056008 A1 relates to a diesel particulate removing apparatus made up of an outer cylinder being attached, in an embedded manner, to an exhaust gas path of a diesel engine and having apertures on sides of flow-in and flow-out of diesel exhaust gas and two or more filter units being housed in the outer cylinder to collect or to collect and burn particulates contained in the diesel exhaust gas to remove them.

There is a continuous need to improve the function of exhaust aftertreatment arrangements, so as to reduce the environmental impact of the exhaust gases, and so as to continuously meet harder legislation in the field.

SUMMARY

An object of the invention is to provide an exhaust aftertreatment arrangement which provides improved efficiency.

The object is achieved by an exhaust aftertreatment arrangement according to claim 1 and/or an exhaust aftertreatment unit according to claim 16.

As such, the invention relates to an exhaust aftertreatment arrangement for an exhaust system of an internal combustion engine, the exhaust aftertreatment arrangement comprising a fluid passage for exhaust gases from the exhaust system, the fluid passage defining an inner perimeter. The exhaust aftertreatment arrangement further comprises an exhaust aftertreatment unit comprising an exhaust aftertreatment element confined by an outer wall defining an outer periphery of the exhaust aftertreatment unit. The exhaust aftertreatment unit is sealingly arranged in the fluid passage, for example, by a sealing member disposed in a gap between the outer periphery of the exhaust aftertreatment unit and the inner perimeter of the fluid passage, for enabling flow of the exhaust gases through the exhaust aftertreatment element. A leakage treatment member comprising an exhaust aftertreatment component is arranged between the inner perimeter of the fluid passage and the outer periphery of the outer wall of the exhaust aftertreatment unit, for aftertreatment of any leakage of the flow of exhaust gases past the aftertreatment unit in the fluid passage.

In prior art arrangements, despite the exhaust aftertreatment unit being sealingly arranged in the fluid passage, leakages in the sealing arrangement may allow minor amounts of exhaust gases to bypass the exhaust aftertreatment unit. This minor amount of exhaust gas may flow through the exhaust system without passing the exhaust aftertreatment unit, meaning that the particles and/or gas emissions in the minor amount of exhaust gas may pass untreated to the environment. Although the amount of untreated exhausted gas is relatively small, the gas emissions and/or particles contained therein may significantly contribute to the total amount of emissions that passes through the aftertreatment system.

By provision of a leakage treatment member comprising an exhaust aftertreatment component, exhaust gas leakage past the exhaust aftertreatment unit will be subject to exhaust aftertreatment by the presence of the exhaust aftertreatment component. Accordingly, the number of particles and/or amount of gas emissions in the total exhaust from the engine will be reduced.

The leakage treatment member comprises at least one exhaust aftertreatment component. Hence, the leakage treatment member may comprise elements in addition to the exhaust aftertreatment component, such as sealing elements or other elements for example for carrying the exhaust aftertreatment component. In certain variants however, the leakage treatment member may consist of the exhaust aftertreatment component.

The leakage flow may for example be less than 1% of the total exhaust flow rate. Nevertheless, the bypass leakage may significantly add e.g. to particulate number emissions.

A benefit achieved by the provision of a leakage treatment member is that the leakage requirements between the exhaust aftertreatment unit and the fluid passage may be less strict, which means that less complicated sealing designs may be used.

That the exhaust aftertreatment unit is sealingly arranged in the fluid passage generally means that any exhaust gas flow bypassing the exhaust aftertreatment unit is unintentional. However, since a 100% secure sealing is difficult to achieve, the leakage treatment member still becomes useful.

Optionally, the leakage treatment member is arranged such that less than 10% of the total exhaust flow rate through the fluid passage bypasses the exhaust aftertreatment unit and flows through the leakage treatment member.

Optionally, the leakage treatment member is arranged such that less than 5% of the total exhaust flow rate through the fluid passage, preferably less than 2% of the total exhaust flow rate through the fluid passage, most preferred less than 1% of the total exhaust flow rate through the fluid passage bypasses the exhaust aftertreatment unit and flows through the leakage treatment member.

Optionally, an area of a section of the leakage treatment member is 3 to 25% of the area of a section of the aftertreatment element, preferably 3 to 15%, most preferred 3 to 10%.

Optionally, the exhaust aftertreatment element is a Diesel Oxidation Catalyst element, a Diesel Particulate Filter element, a Selective Catalyst Reduction element, or an Ammonia Slip Catalyst element Optionally, the exhaust aftertreatment component of the leakage treatment member is a Diesel Oxidation Catalyst component and/or a Selective Catalyst Reduction component and/or an Ammonia Slip Catalyst component and/or a component having a particle filtering function.

Optionally, the leakage treatment member may comprise one single exhaust aftertreatment component.

Optionally, the leakage treatment member may comprise more than one exhaust aftertreatment component.

Diesel Oxidation Catalyst components may be Pt and/or Pd and/or Rd or any other type of oxidation catalyst.

Selective Catalyst components may be based on a zeolite with Fe and/or Cu, or being based on Vanadium or Antimony or any other type of SCR catalyst.

Optionally, the exhaust aftertreatment component is provided as a coating. The provision of an exhaust aftertreatment component as a coating is well-known in the art and a useful option for providing different types of leakage treatment members.

Optionally, the leakage treatment member is a fluid sealing member arranged to fluidly seal between the outer wall and the inner perimeter. As such, the leakage treatment member may fulfil the double purposes of diminishing the leakage of exhaust gases past the exhaust aftertreatment unit, and treating any leakage which may occur. For example, the exhaust aftertreatment component may be provided as a coating on at least a part of such a fluid sealing leakage treatment member.

Optionally, the leakage treatment member is the only fluid sealing member arranged to fluidly seal between the outer wall and the inner perimeter. This provides for only one member being necessary between the outer wall and the inner perimeter, hence reducing the number of parts providing savings in materials and in assembly costs.

Optionally, the leakage treatment member is a non-sealing member, such as comprising a wiremesh member and/or comprising a metal fleece component. A non-sealing member may be optimised for different purposes. For example, a non-sealing member may be selected so as to provide an increased contact surface of the leakage exhaust gases, for enabling efficient treatment thereof. A wiremesh member is an example of such a surface. The exhaust aftertreatment component may advantageously be provided as a coating on the non-sealing member, e.g. on the wiremesh member.

Optionally, the leakage treatment member is a non-sealing member comprising an exhaust aftertreatment component having a particle filtering function. The exhaust aftertreatment component may for example be a metal fleece or ceramic fiber mat or glassfibre mat that may, although gas emissions are passing freely therethrough, be semi-transparent for soot particles, increasing the residence time for said soot particles in the leakage treatment member, and thereby increasing the efficiency of the soot oxidation process. When the leakage treatment member comprises only an exhaust aftertreatment component having a particle filtering function, the leakage treatment member may consist of said exhaust aftertreatment component.

Optionally, a fluid sealing device is arranged to fluidly seal between the outer wall and the inner perimeter. Such a fluid sealing device may be a conventional fluid sealing device, not provided with any exhaust aftertreatment component. One or more fluid sealing devices may be arranged to complement the fluid sealing provided by a leakage treatment member also being a fluid sealing member. One or more fluid sealing devices may be arranged so as to provide the desired sealing between the exhaust aftertreatment unit and the fluid passage when the leakage treatment member is a non-sealing device.

Optionally, one or more fluid sealing devices may be arranged upstream one or more leakage treatment members.

Optionally, one or more fluid sealing devices may be arranged downstream one or more leakage treatment members.

Optionally, the leakage treatment member is arranged so as to extend radially all the way between the outer wall and the inner perimeter. Optionally, the leakage treatment member is arranged so as to extend circumferentially continuously around the outer wall and the inner perimeter. As such, it may be ensured that as much as possible of the leakage flow of exhaust gas past the exhaust aftertreatment unit is treated by the leakage treatment member.

Optionally, the exhaust aftertreatment unit may be arranged to be removable from and reattachable to the exhaust aftertreatment arrangement for replacement of the exhaust aftertreatment element. For removable exhaust aftertreatment units, the leakage flow past the unit may be relatively high due to it being removable from the remainder of the exhaust aftertreatment arrangement. For example, the replaceable exhaust aftertreatment element may be a Diesel Particulate Filter element. Diesel Particulate Filter elements generally require regular replacement. However, other exhaust aftertreatment elements as exemplified herein may also benefit from being replaceable and arranged in a removable exhaust aftertreatment unit.

Optionally, the exhaust aftertreatment unit comprises a mounting sleeve, the mounting sleeve forming the outer wall in which the exhaust aftertreatment element is confined.

Optionally, the mounting sleeve may be arranged to be removable from and reattachable to the exhaust aftertreatment arrangement for replacement of the exhaust aftertreatment element. In such an arrangement, the leakage flow may be relatively high due to the mounting sleeve necessarily being removable from the remainder of the arrangement.

Optionally, the leakage treatment member is attached to the outer wall.

Optionally, the aftertreatment arrangement is a muffler arrangement.

Optionally, the aftertreatment arrangement may comprise a casing comprising an inlet and an outlet for exhaust gas.

Optionally, the aftertreatment arrangement may comprise an additional exhaust aftertreatment unit arranged upstream of the exhaust aftertreatment unit. For example, the additional exhaust aftertreatment unit may be a DOC.

Optionally, the aftertreatment arrangement may comprise an additional exhaust aftertreatment unit arranged downstream of the exhaust aftertreatment unit. For example, the additional exhaust aftertreatment unit may be a SCR.

Optionally, when the aftertreatment arrangement comprises an exhaust aftertreatment unit being an SCR unit, the aftertreatment arrangement may comprise a reducing agent supply member, in particular a urea supply member or an ammonia supply member.

In a second aspect, the invention relates to an exhaust aftertreatment system comprising an internal combustion engine and an exhaust gas fluid path for exhaust gases from the engine, wherein the exhaust gas fluid path comprises an exhaust aftertreatment arrangement in accordance with the first aspect.

In a third aspect, the invention relates to a vehicle comprising an exhaust aftertreatment arrangement in accordance with the first aspect.

In a fourth aspect, the invention relates to an exhaust aftertreatment unit for arrangement in a fluid passage of an exhaust aftertreatment system for treating exhaust from an internal combustion engine, the exhaust aftertreatment unit comprising an exhaust aftertreatment element confined by an outer wall defining an outer periphery of the exhaust aftertreatment unit. A leakage treatment member comprising an exhaust aftertreatment component is arranged at the outer periphery of the outer wall of the exhaust aftertreatment unit for aftertreatment of any leakage of said flow of exhaust gases past the aftertreatment unit in the fluid passage.

Features and advantages as described in relation to any one of the aspects of the invention are similarly applicable to other aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
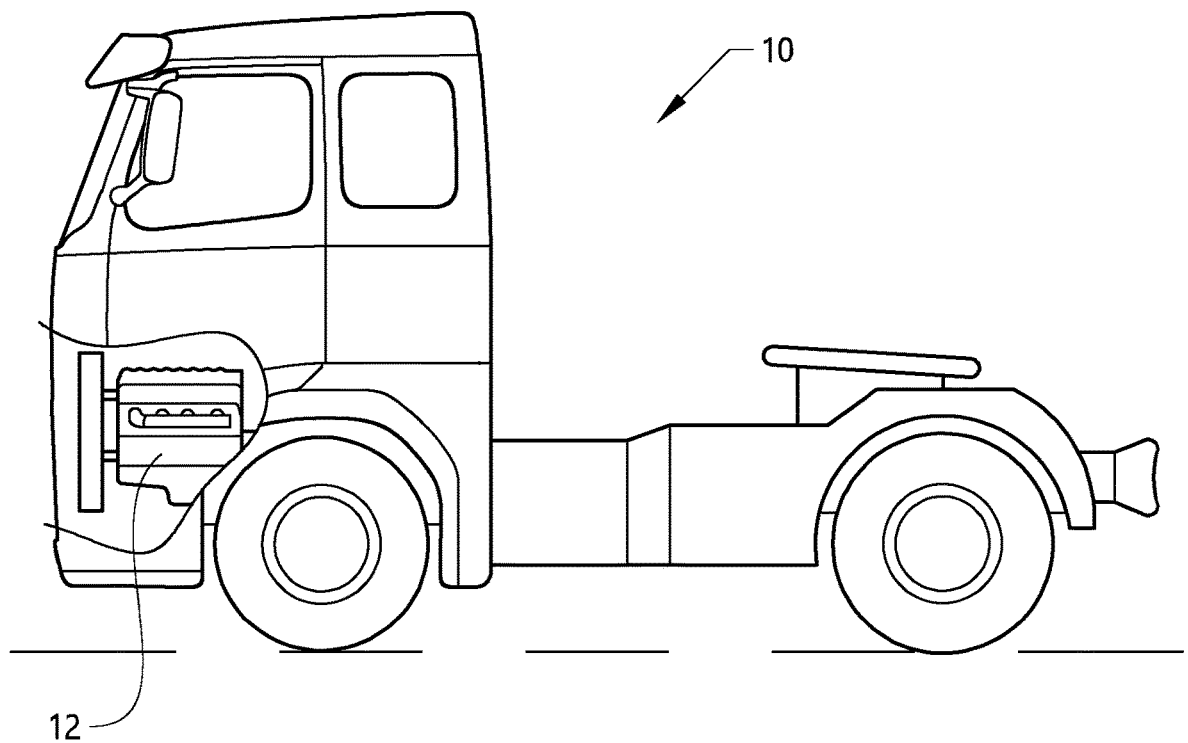
FIG. 1 is a schematic view of a vehicle.

FIG. 1 illustrates schematically a vehicle, in this case a truck 10, comprising an internal combustion engine 12. However, the present disclosure is not limited to this type of vehicle or to the illustrated positioning of the engine.

Figure 2A:
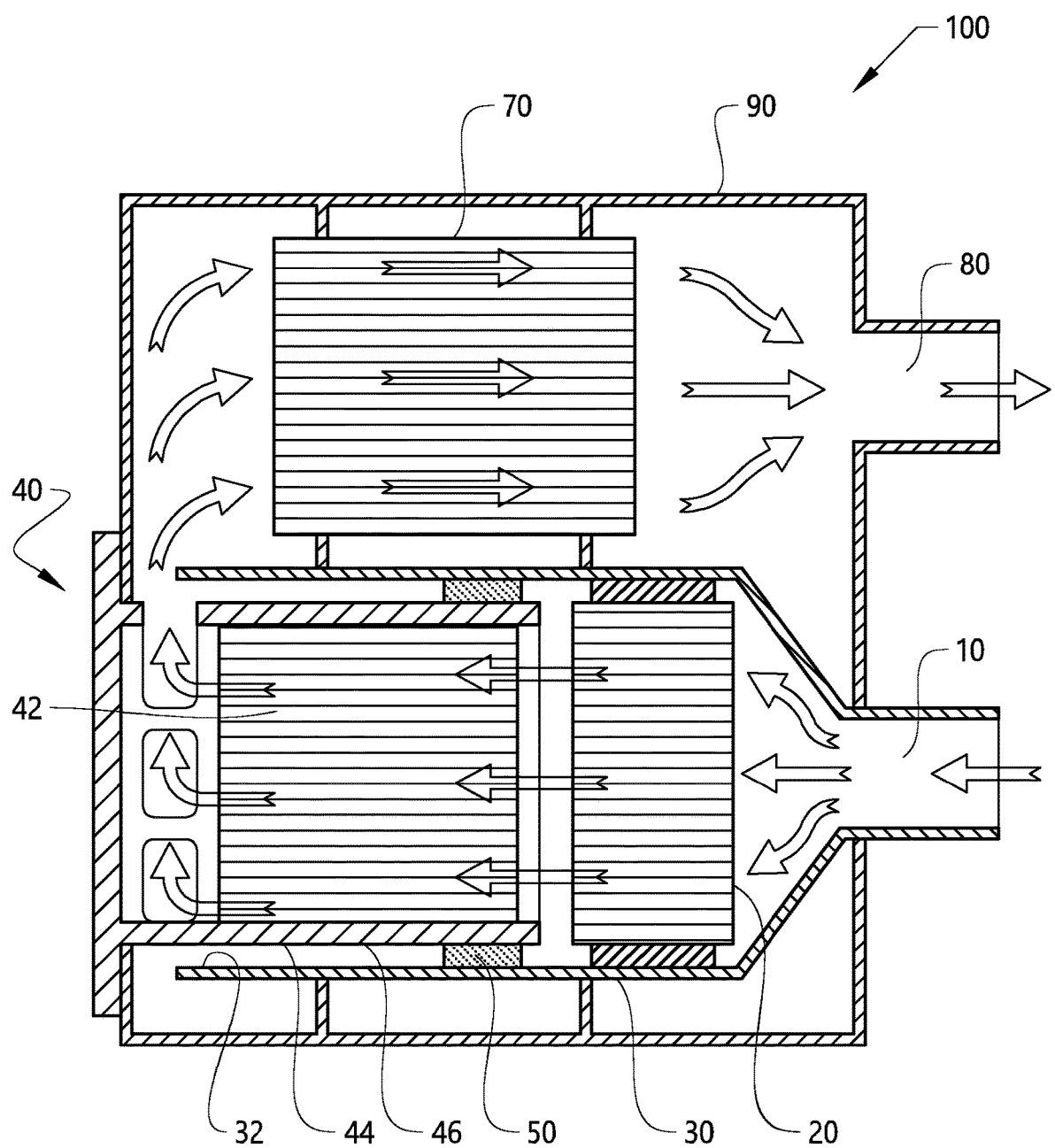
FIGS. 2a and 2b are schematic views of a first embodiment of an exhaust aftertreatment system.

FIG. 2a illustrates schematically a first embodiment of an exhaust aftertreatment arrangement 100. The exhaust aftertreatment arrangement 100 is intended to be arranged downstream an internal combustion engine. The exhaust aftertreatment arrangement 100 comprises an inlet 10 for receiving an exhaust gas flow from the engine. Further, the exhaust aftertreatment arrangement 100 comprises an outlet 80 for emitting treated exhaust gas from the exhaust aftertreatment arrangement.

The exhaust aftertreatment arrangement 100 comprises at least one exhaust aftertreatment unit 40 comprising an exhaust aftertreatment element 42 confined by an outer wall 44 defining an outer periphery 46 of the exhaust aftertreatment unit 40.

The exhaust aftertreatment element 42 may be any element used for treating exhaust gas in order to reduce the amount of particles and/or gas emissions. For example, the exhaust aftertreatment element may be a DOC (Diesel Oxidation Catalyst), a DPF (Diesel Particle Filter), a SCR (Selective Catalytic Reduction) or an ASC (Ammonia Slip Catalyst).

In the illustrated embodiment, the exhaust aftertreatment element 42 is a DPF. The exhaust aftertreatment element 42 is arranged in a mounting sleeve 44, forming the outer wall. The mounting sleeve 44 may for example be a steel sleeve.

The exhaust aftertreatment unit 40 is arranged in a fluid passage 30 between the inlet 10 and the outlet 80 of the exhaust aftertreatment arrangement. To ensure that the exhaust gas flow passes through the exhaust aftertreatment unit 40, and does not pass between the outer periphery 46 of the outer wall 44 of the exhaust aftertreatment unit 40 and an inner perimeter 32 of the fluid passage 30, the unit 40 is sealingly arranged in the fluid passage 30. When in use, the exhaust gas flow will generally pass from the inlet 10, through the exhaust aftertreatment unit 40 and out through the outlet 80 as indicated by the arrows in FIG. 2a.

Figure 2B:
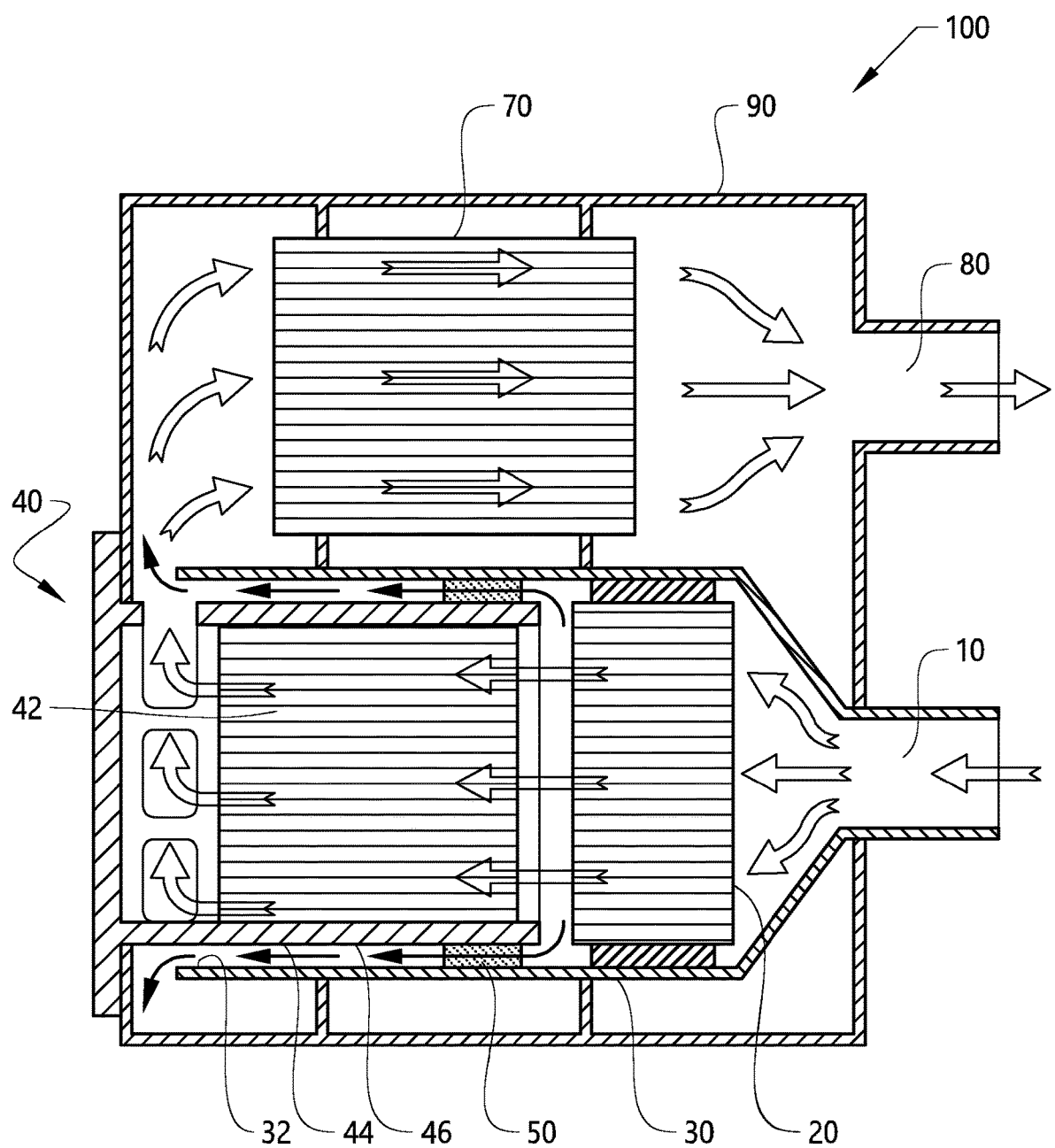

However, as illustrated in FIG. 2b, a minor amount of the exhaust gas flow might bypass the exhaust aftertreatment unit 40, and pass between the outer periphery 46 of the outer wall 44 of the exhaust aftertreatment unit 40 and an inner perimeter 32 of the fluid passage 30.

In the embodiment of FIGS. 2a and 2b, a leakage treatment member 50 comprising an exhaust aftertreatment component is arranged between the inner perimeter 32 of the fluid passage 30 and the outer periphery 46 of the outer wall of the exhaust aftertreatment unit 40. Hence, any leakage of the exhaust gas flow past the aftertreatment unit 40 will instead pass the leakage treatment member 50 and be treated by the exhaust aftertreatment component thereof.

It is still desired that the exhaust aftertreatment unit 40 shall be sealingly arranged in the fluid passage 30. Accordingly, some sealing is preferably provided between the exhaust aftertreatment unit 40 and the fluid passage 30.

In the embodiment of FIGS. 2a and 2b, the leakage treatment member 50 also forms a sealing member. For example, the leakage treatment member 50 may be a sealing ring which is provided with a coating comprising a leakage treatment component.

Suitable leakage treatment components may be such as known in the art of aftertreatment of exhaust gases, such as a Diesel Oxidation Catalyst component or a Selective Catalyst Reduction component and/or a component having a particle filtering function.

In the exhaust aftertreatment arrangement 100 illustrated in FIGS. 2a and 2b, there is a first additional exhaust aftertreatment unit 20 which is arranged upstream of the previously described exhaust aftertreatment unit 40. For example, the first additional exhaust aftertreatment unit 20 may be a DOC.

Further, in the illustrated arrangement of FIGS. 2a and 2b, there is a second additional exhaust aftertreatment unit 70, arranged downstream the first described exhaust aftertreatment unit 40. For example, the second additional exhaust aftertreatment unit 70 may be an SCR.

Hence, in the illustrated embodiment, the exhaust gas flow will pass through the inlet 10, via a DOC 20 to a DPF 40, further on to a SCR and then out via the outlet 80. However, it is to be understood that the invention may be applied to numerous different exhaust aftertreatment arrangements.

As described in the above, the exhaust aftertreatment unit 40 comprises an exhaust aftertreatment element 42 arranged in a mounting sleeve 44. Moreover, in the illustrated embodiment, the exhaust aftertreatment unit 40 is removable from and reattachable to the exhaust aftertreatment arrangement 100. Hence, a used exhaust aftertreatment unit 40 may be removed from the exhaust aftertreatment arrangement and replaced with a new exhaust aftertreatment unit 40, when required. The leakage treatment member 50 may conveniently be attached to the outer wall 44 of the mounting sleeve.

In the embodiment illustrated in FIGS. 2a and 2b, the exhaust aftertreatment arrangement 100 is in the form of a muffler. However, other types of exhaust aftertreatment arrangements are naturally conceivable.

Figure 3:
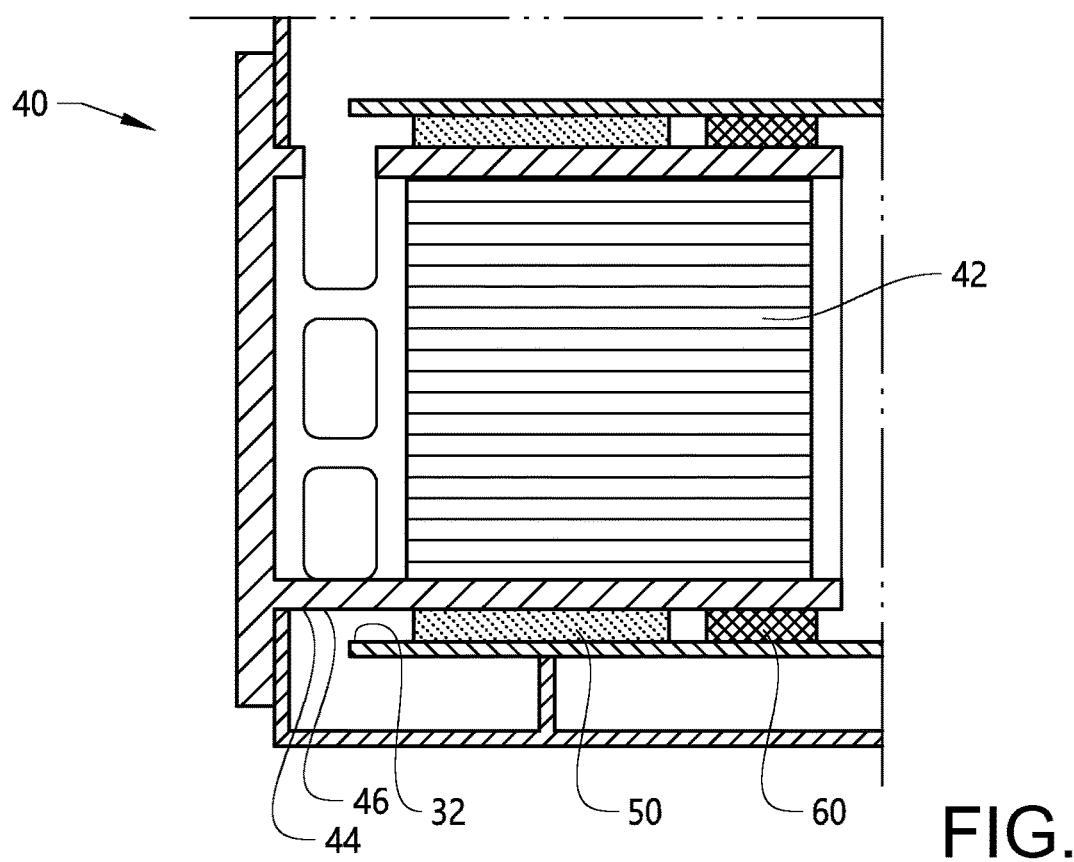
FIG. 3 is a schematic view of a second embodiment of an exhaust aftertreatment arrangement.

FIG. 3 illustrates schematically an embodiment of a part of an exhaust aftertreatment system 100. The arrangement of an exhaust aftertreatment unit 40 in a fluid passage 30 is similar to that described in relation to FIGS. 2a and 2b above. In the arrangement of FIG. 3, a leakage treatment member 50 being a non-sealing member is arranged between the inner perimeter 32 of the fluid passage 30 and the outer periphery 46 of the outer wall 44 of the exhaust aftertreatment unit 40. The leakage treatment member 50 may for example be a wiremesh member. The wiremesh member 50 may be provided with an exhaust aftertreatment component in the form of a coating. In addition, a fluid sealing device 60 is arranged to fluidly seal between the outer wall 44 and the inner perimeter 32. In the arrangement illustrated in FIG. 3, the fluid sealing device 60 is arranged upstream the leakage treatment member 50. Hence, any part of the exhaust gas flow which leaks through the fluid sealing device 60 will pass the leakage treatment member 50 and be treated.

Figure 4:
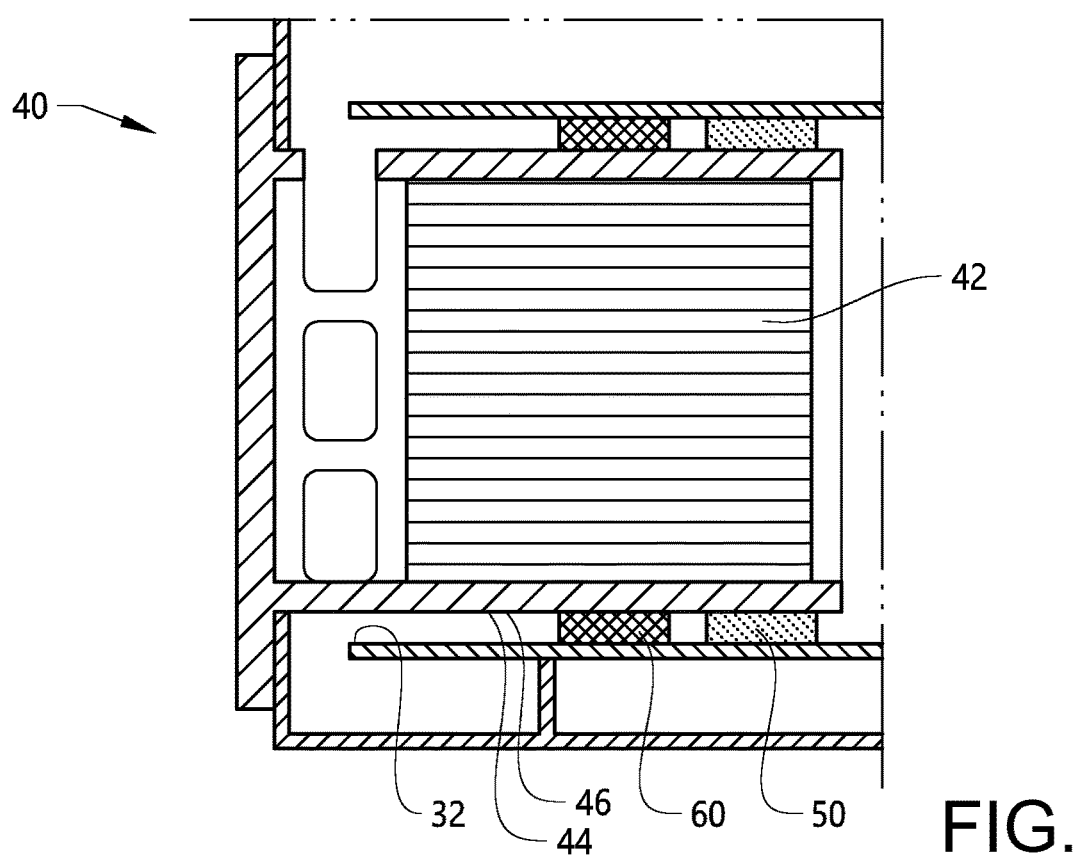
FIG. 4 is a schematic view of a third embodiment of an exhaust aftertreatment arrangement.

FIG. 4 illustrates schematically another embodiment of a part of an exhaust aftertreatment system 100. The embodiment is similar to that described in relation to FIG. 3, but for that in this case, the leakage treatment member 50 is arranged upstream the fluid sealing device 60.

Figure 5:
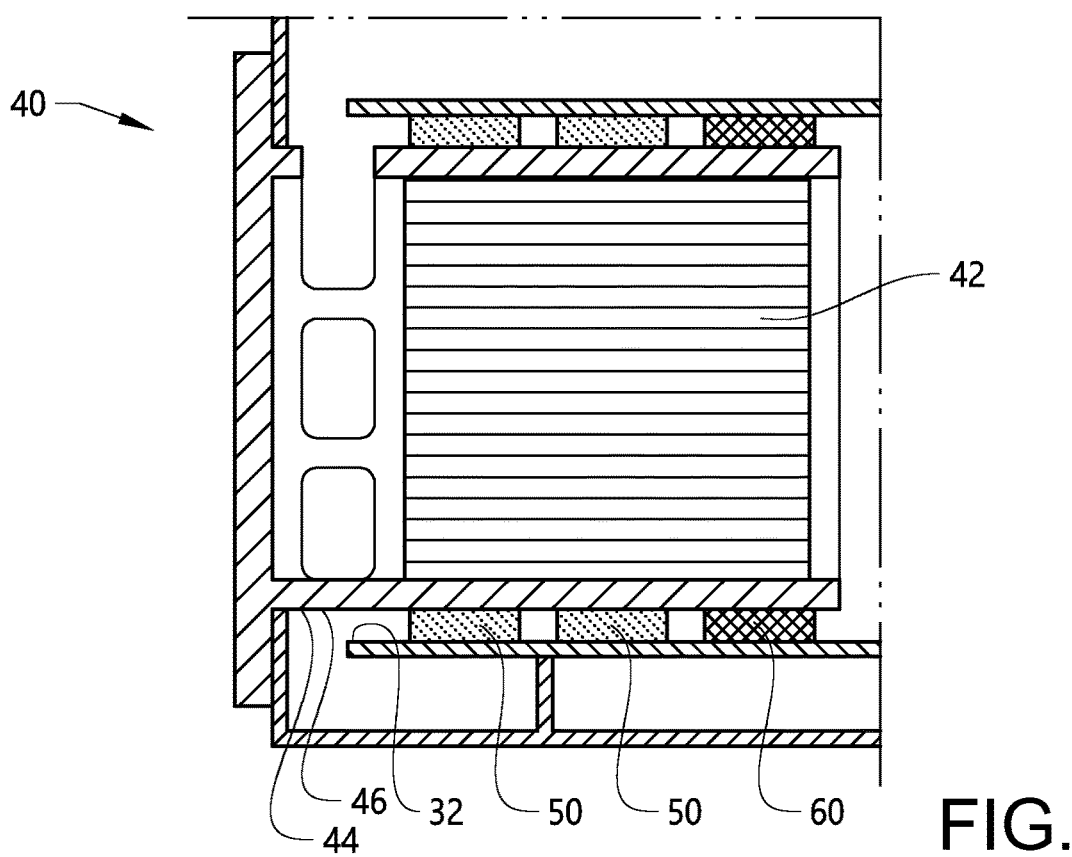
FIG. 5 is a schematic view of a fourth embodiment of an exhaust aftertreatment arrangement.

FIG. 5 illustrates schematically yet another embodiment of a part of an exhaust aftertreatment system 100. The embodiment is similar to those previously described, but in this case, one sealing device 60 and two leakage treatment members 50 are arranged. The leakage sealing members 50 may be fluid sealing members or non-sealing members.

Figure 6:
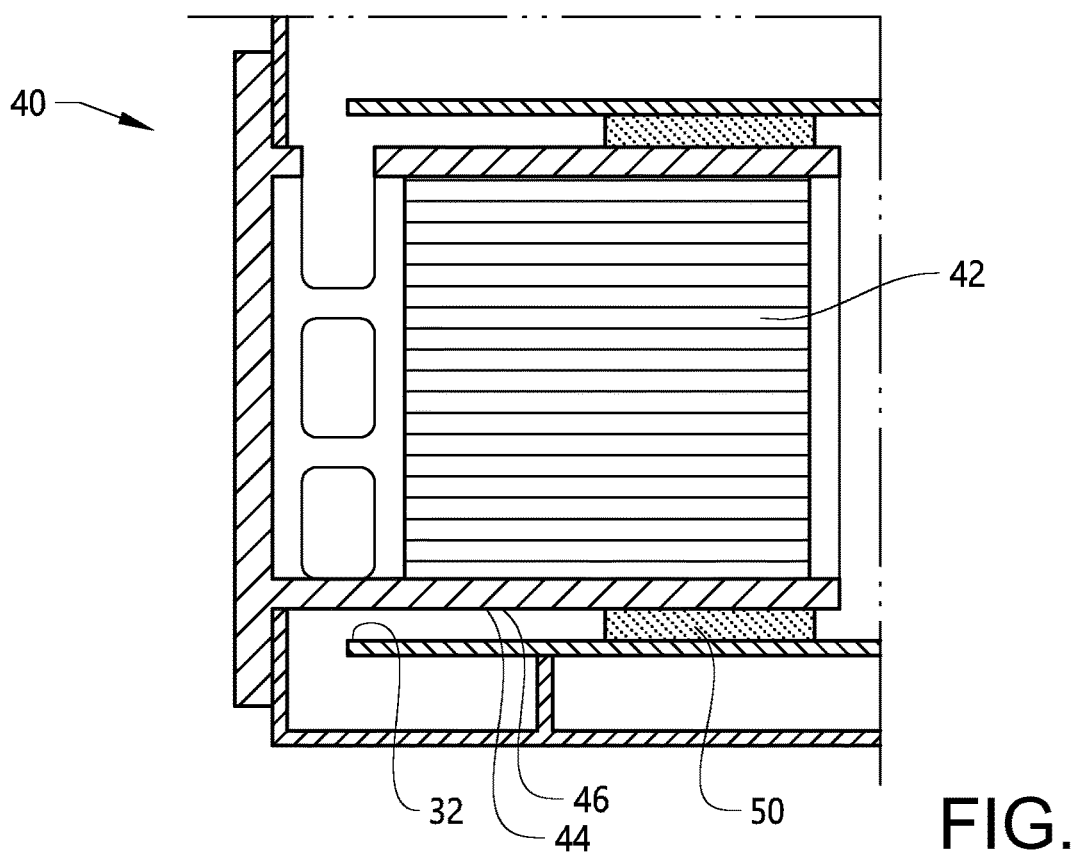
FIG. 6 is a schematic view of a fifth embodiment of an exhaust aftertreatment arrangement.

FIG. 6 illustrates schematically yet another embodiment of a part of an exhaust aftertreatment system 100. The embodiment is similar to those previously described, but in this case, there is only one leakage treatment member 50, and the leakage treatment member is a non-sealing member. This variant may be preferred for example if there is no sealing component arranged between the inner perimeter 32 of the fluid passage 30 and the outer periphery 46 of the outer wall 44 of the exhaust aftertreatment unit 40. In this case, a sealing arrangement may for example nevertheless be achieved by very close fit between the inner perimeter 32 and the outer periphery 46 at least along a portion of the fluid passage 30 (this is not shown in FIG. 6). It is envisaged however, that in this case, a gap between the inner perimeter 32 and the outer periphery 46 along another portion of the fluid passage 30 would need to be provided, the gap providing space for arrangement of the leakage treatment member 50.

With a leakage treatment member 50 as suggested herein, one advantage is that the requirements for the fluid seal between the fluid passage 30 and the exhaust aftertreatment unit 40 may be slightly relaxed, since any leakage of exhaust fluid past the exhaust aftertreatment unit 40 need no longer result in relatively significant increase of unwanted particles and/or substances in the exhaust.

Moreover, the benefits of a leakage treatment member 50 as suggested herein, may be particularly useful when the exhaust aftertreatment unit 40 is arranged to be removable and reattachable to the exhaust aftertreatment arrangement 100, for example for replacement of the exhaust aftertreatment element 42.

It is to be understood that the present invention is not limited to the embodiments described above and illustrated in the drawings; rather, the skilled person will recognize that many changes and modifications may be made within the scope of the appended claims.

For example, various combinations of leakage treatment members and/or sealing members are conceivable. Moreover, various combinations of leakage treatment members having different exhaust aftertreatment components may be used. Also, a leakage treatment member may comprise various combinations of exhaust aftertreatment components.

The invention claimed is:

1. An exhaust aftertreatment arrangement for an exhaust system of an internal combustion engine, said exhaust aftertreatment arrangement comprising: a fluid passage for exhaust gases from said exhaust system, said fluid passage defining an inner perimeter; and said exhaust aftertreatment arrangement further comprising an exhaust aftertreatment unit comprising an exhaust aftertreatment element confined by an outer wall defining an outer periphery of said exhaust aftertreatment unit; said exhaust aftertreatment unit being sealingly arranged in said fluid passage for enabling flow of said exhaust gases through said exhaust aftertreatment element; a leakage treatment member comprising an exhaust aftertreatment component is arranged between said inner perimeter of said fluid passage and said outer periphery of said outer wall of said exhaust aftertreatment unit, for aftertreatment of any leakage of said flow of exhaust gases past said aftertreatment unit in said fluid passage.

2. An exhaust aftertreatment arrangement according to claim 1, wherein said exhaust aftertreatment element is a Diesel Oxidation Catalyst element, a Diesel Particulate Filter element, a Selective Catalyst Reduction element, or an Ammonia Slip Catalyst element.

3. An exhaust aftertreatment arrangement according to claim 1 wherein said exhaust aftertreatment component of said leakage treatment member is at least one of a Diesel Oxidation Catalyst component, and a Selective Catalyst Reduction component, and an Ammonia Slip Catalyst component, and a component having a particle filtering function.

4. An exhaust aftertreatment arrangement in accordance with claim 1, wherein said exhaust aftertreatment component is provided as a coating.

5. An exhaust aftertreatment arrangement in accordance with claim 1, wherein said leakage treatment member is a fluid sealing member arranged to fluidly seal between said outer wall and said inner perimeter.

6. An exhaust aftertreatment arrangement in accordance with claim 5, wherein said leakage treatment member is the only fluid sealing member arranged to fluidly seal between said outer wall and said inner perimeter.

7. An exhaust aftertreatment arrangement in accordance with claim 1, wherein said leakage treatment member is a non-sealing member, comprising a wiremesh member and comprising a metal fleece component.

8. An exhaust aftertreatment arrangement in accordance with claim 5, wherein further a fluid sealing device is arranged to fluidly seal between said outer wall and said inner perimeter.

9. An exhaust aftertreatment arrangement in accordance with claim 1, wherein said leakage treatment member is arranged so as to extend radially all the way between said outer wall and said inner perimeter, and circumferentially continuously around said outer wall and said inner perimeter.

10. An exhaust aftertreatment arrangement in accordance with claim 1, wherein said exhaust aftertreatment unit is arranged to be removable from and reattachable to said exhaust aftertreatment arrangement for replacement of said exhaust aftertreatment element.

11. An exhaust aftertreatment arrangement in accordance with claim 1, wherein said exhaust aftertreatment unit comprises a mounting sleeve, said mounting sleeve forming said outer wall in which said exhaust aftertreatment element is confined, said mounting sleeve is arranged to be removable from and reattachable to said exhaust aftertreatment arrangement for replacement of the exhaust aftertreatment element.

12. An exhaust aftertreatment arrangement in accordance with claim 1, wherein said leakage treatment member is attached to said outer wall.

13. An exhaust aftertreatment arrangement in accordance with claim 1, wherein said aftertreatment arrangement is a muffler arrangement.

14. An exhaust aftertreatment system comprising an internal combustion engine and an exhaust gas fluid path for exhaust gases from said engine, wherein said exhaust gas fluid path comprises an exhaust aftertreatment arrangement in accordance with claim 1.

15. A vehicle comprising an exhaust aftertreatment arrangement in accordance with claim 1.

16. An exhaust aftertreatment unit for arrangement in a fluid passage of an exhaust aftertreatment system for treating exhaust from an internal combustion engine, said exhaust aftertreatment unit comprising an exhaust aftertreatment element confined by an outer wall defining an outer periphery of said exhaust aftertreatment unit; a leakage treatment member comprising an exhaust aftertreatment component is arranged to said outer periphery of said outer wall of said exhaust aftertreatment unit, for aftertreatment of any leakage of said flow of exhaust gases past said aftertreatment unit in said fluid passage.

17. An exhaust aftertreatment arrangement in accordance with claim 1, wherein said leakage treatment member is a non-sealing member, comprising a wiremesh member or comprising a metal fleece component.

18. An exhaust aftertreatment arrangement in accordance with claim 1, wherein said leakage treatment member is arranged so as to extend radially all the way between said outer wall and said inner perimeter or circumferentially continuously around said outer wall and said inner perimeter.

* * * * *